B. M. Quint.
Plant Protector.
No. 90,194.    Patented May 18, 1869.
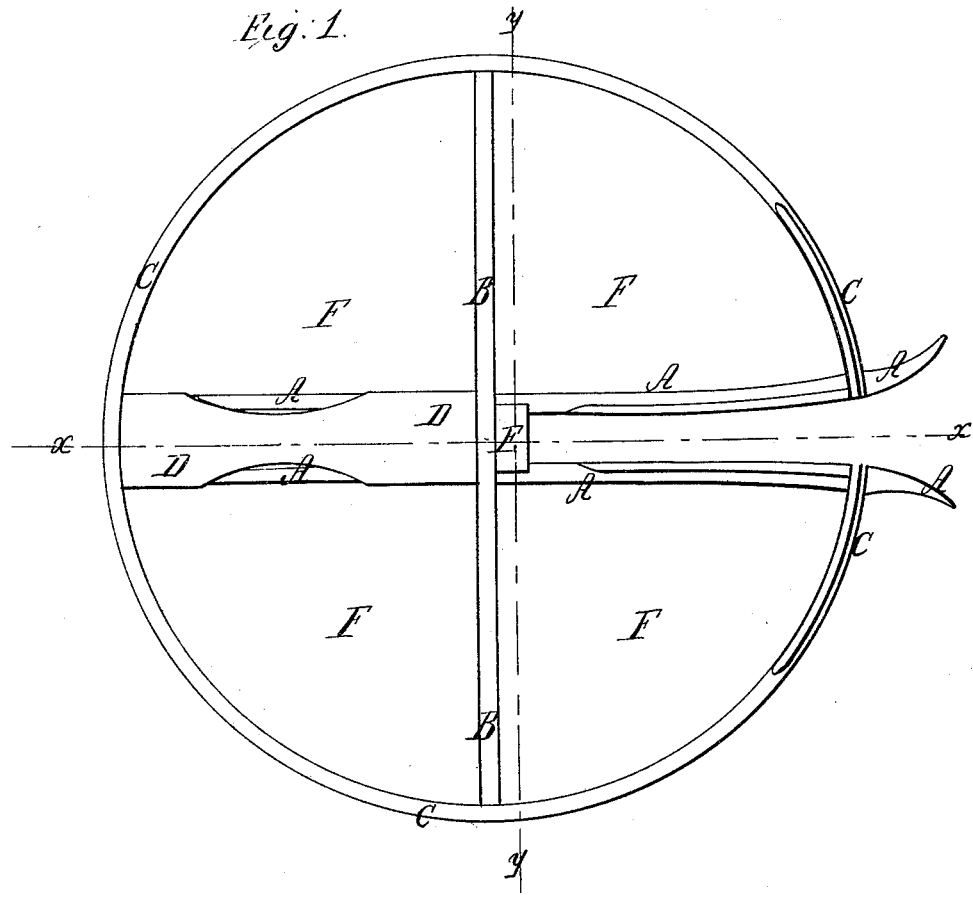
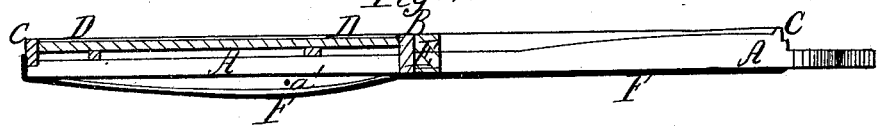
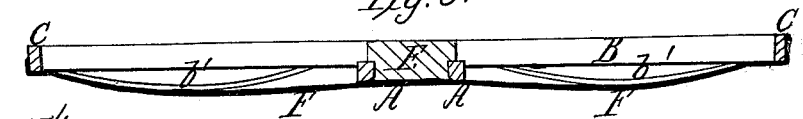
Witnesses:
John F. Brooks
E. Greene Collins
Inventor:
B. M. Quint
per Munn & Co.
Attorneys

United States Patent Office.

B. M. QUINT, OF ST. JOSEPH, MICHIGAN.

Letters Patent No. 90,194, dated May 18, 1869.

---

IMPROVEMENT IN INSECT-TRAP FOR PROTECTING FRUIT WHILE GROWING.

---

The Schedule referred to in these Letters Patent and making part of the same.

---

*To all whom it may concern:*

Be it known that I, B. M. QUINT, of St. Joseph, in the county of Berrien, and State of Michigan, have invented a new and improved Insect-Trap; and I do hereby declare that the following is a full, clear, and exact description thereof, which will enable others skilled in the art to make and use the same, reference being had to the accompanying drawings, forming part of this specification, in which—

Figure 1 is a top view of my improved trap.

Figure 2 is a detail sectional view of the same, taken through the line $x$ $x$, fig. 1.

Figure 3 is a detail sectional view of the same, taken through the line $y$ $y$, fig. 1.

Similar letters of reference indicate corresponding parts.

My invention has for its object to furnish an improved trap for removing curculio, and the wormy and blighted fruit from peach and other fruit-trees, which shall be simple in construction, and convenient and effective in use, enabling the work to be done with great rapidity; and It consists in the trap, constructed in the manner hereinafter more fully described.

A are two parallel bars, extending entirely across the frame-work of the trap, and at a distance apart depending upon the size of the trees to be operated upon.

B is a bar, crossing the middle part of the bars A at right angles, and securely attached to said bars.

C is the outer rim or frame, which is attached to the ends of the bars A and B, and which may be circular, square, or of any other desired form.

The frame C extends entirely around the apparatus, except at one end of the two bars A, which end of said bars should project a little beyond the said frame, and the inner sides of which ends should be bevelled off, for convenience in placing it upon the trees.

D is a plank, extending along the bars A, from the frame C, at the closed end of the said bars A, to the cross-bar B, to strengthen and brace that part of the frame that receives the shock in using the trap.

E is a rubber block, placed between the open parts of the bars A, and resting against and secured to the cross-bar B, where it is supported by the end of the plank D.

F is a sheet of cloth, or other suitable material, the edges of which are secured to the edges of the frame C, and to the open part of the bars A, as shown in the drawings, and which may be held a little away from the bar B and closed part of the bars A, by small bows or springs, $a'$ and $b'$, as shown in figs. 2 and 3.

In using the trap, the open ends of the bars A are placed upon the opposite sides of the trunk of the tree to be operated upon, and the trap is moved rapidly forward, until the rubber block E strikes against the tree, jarring it sufficiently to cause the insects and wormy and blighted fruit to fall into the trap.

The trap is then removed, and another tree operated upon in the same manner, the insects and fruit being emptied out and destroyed as often as may be necessary.

Having thus described my invention,

I claim as new, and desire to secure by Letters Patent—

An improved insect-trap, formed by the combination of the two parallel bars A, open at one end, cross-bar B, outer frame C, plank or brace D, rubber block E, and sheet F, with each other, substantially in the manner herein shown and described, and for the purpose set forth.

B. M. QUINT.

Witnesses:
HIRAM BROWN,
E. M. EDWARDS.